(12) United States Patent
Ambrosetti et al.

(10) Patent No.: US 12,078,389 B2
(45) Date of Patent: Sep. 3, 2024

(54) METHOD FOR OPERATING A RECEIVER AND RECEIVER FOR CARRYING OUT THE METHOD

(71) Applicant: Synhelion SA, Chur (CH)

(72) Inventors: Gianluca Ambrosetti, Gintilino (CH); Philipp Good, Zurich (CH)

(73) Assignee: Synhelion SA, Chur (CH)

( * ) Notice: Subject to any disclaimer, the term of this patent is extended or adjusted under 35 U.S.C. 154(b) by 0 days.

(21) Appl. No.: 16/609,147

(22) PCT Filed: May 7, 2018

(86) PCT No.: PCT/CH2018/050015
§ 371 (c)(1),
(2) Date: Oct. 28, 2019

(87) PCT Pub. No.: WO2018/205043
PCT Pub. Date: Nov. 15, 2018

(65) Prior Publication Data
US 2022/0090825 A1    Mar. 24, 2022

(30) Foreign Application Priority Data

May 10, 2017 (CH) .................................... CH627/17
Mar. 2, 2018 (CH) .................................... CH260/18

(51) Int. Cl.
*F24S 20/20* (2018.01)
*F24S 70/10* (2018.01)
*F24S 80/20* (2018.01)

(52) U.S. Cl.
CPC ............... *F24S 20/20* (2018.05); *F24S 70/10* (2018.05); *F24S 80/20* (2018.05)

(58) Field of Classification Search
CPC .. F24S 20/20; F24S 70/10; F24S 80/20; F24S 10/00; F24S 20/25; F24S 70/225;
(Continued)

(56) References Cited

U.S. PATENT DOCUMENTS 3,604,400 A    9/1971 Sharan
4,033,118 A    7/1977 Powell
(Continued)

FOREIGN PATENT DOCUMENTS

CN    103392100    11/2013
CN    205337423    6/2016
(Continued)

OTHER PUBLICATIONS

Beltzung, Francis, International Search Report for PCT/CH2018/050015 (dated Sep. 28, 2018) [2 pages].

*Primary Examiner* — David J Laux
(74) *Attorney, Agent, or Firm* — Henry Patent Law Firm PLLC

(57) ABSTRACT

The receiver is provided with the heating area for heating a heat-transporting medium. The receiver has an optical opening for sunlight. An absorber absorbing the sunlight is arranged within the path of the incidental sunlight and with a transport arrangement for the transport of the medium through the heating area. The absorber is designed as a blackbody radiation arrangement with reduced convection and the transport arrangement for the transport of a gas is designed as a heat-transporting medium. By means of this, the receiver can be designed in a simpler and more reliable manner.

46 Claims, 11 Drawing Sheets

Figure 1A:
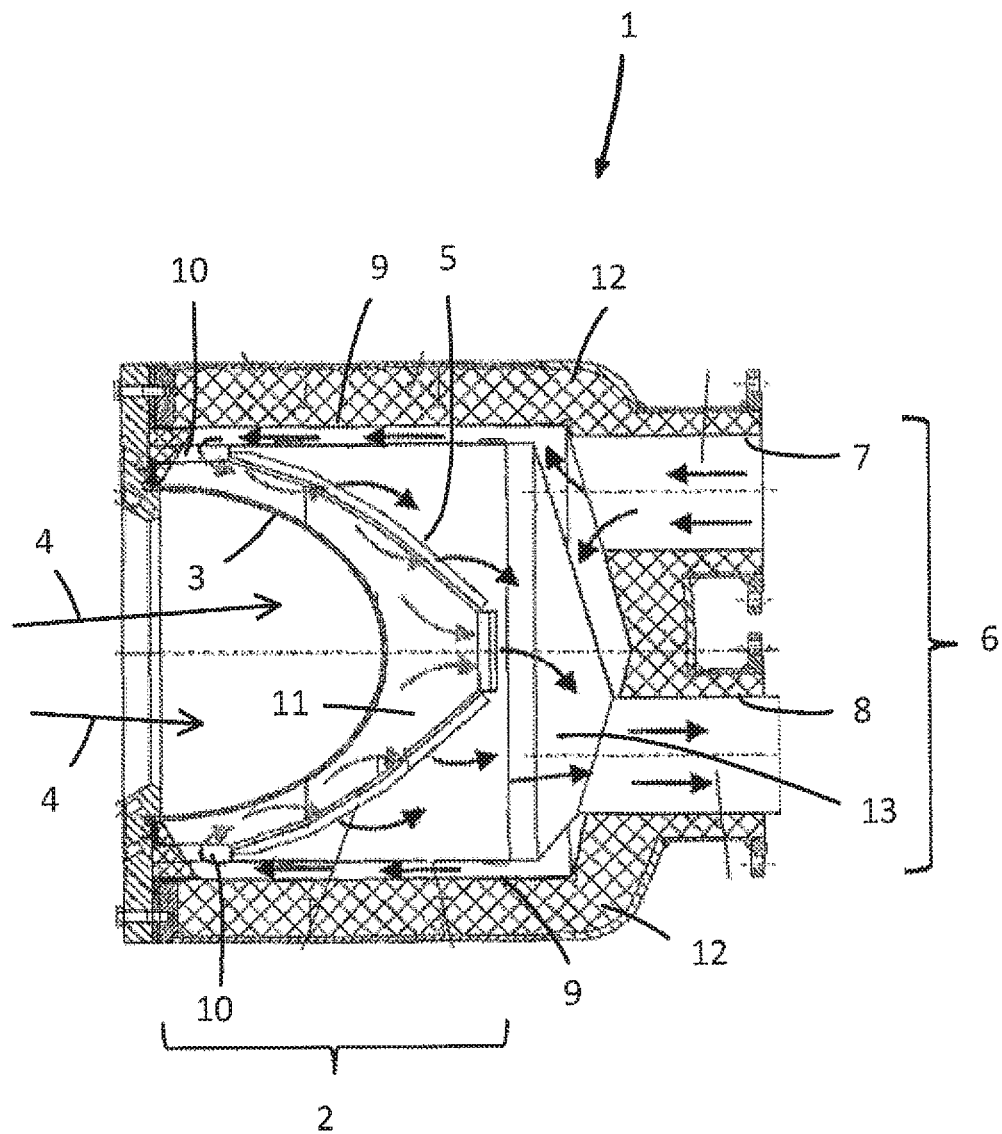

(58) Field of Classification Search
CPC ....... F24S 10/70; F24S 2080/03; Y02E 10/46; Y02E 10/40
See application file for complete search history.

(56) References Cited

U.S. PATENT DOCUMENTS

| | | | |
|---|---|---|---|
| 4,047,517 A | 9/1977 | Arnberg | |
| 4,135,489 A | 1/1979 | Jarvinen | |
| 4,263,895 A | 4/1981 | Colao | |
| 4,455,153 A * | 6/1984 | Jakahi | F24S 20/20 126/684 |
| 4,479,485 A | 10/1984 | McDougal et al. | |
| 4,945,731 A | 8/1990 | Parker et al. | |
| 5,931,158 A * | 8/1999 | Buck | F24S 20/20 126/648 |
| 7,140,181 B1 * | 11/2006 | Jensen | B01J 19/127 48/85 |
| 8,378,280 B2 * | 2/2013 | Mills | F24S 60/00 250/203.4 |
| 9,869,302 B2 | 1/2018 | Hischier et al. | |
| 2002/0083946 A1 * | 7/2002 | Karni | F24S 10/80 126/648 |
| 2011/0220095 A1 * | 9/2011 | Van Der Graaf | F24S 80/52 126/708 |
| 2013/0233300 A1 | 9/2013 | Perryman | |
| 2013/0291541 A1 * | 11/2013 | Hischier | F24S 80/60 60/641.14 |
| 2015/0033740 A1 * | 2/2015 | Anderson | F28D 20/00 60/641.15 |
| 2017/0038096 A1 | 2/2017 | Hilliard | |

FOREIGN PATENT DOCUMENTS

| | | |
|---|---|---|
| DE | 2461973 A1 | 7/1975 |
| DE | 3743798 | 7/1987 |
| DE | 10065485 A1 | 7/2002 |
| EP | 1052461 | 11/2000 |
| EP | 1610073 A2 | 12/2005 |
| EP | 2329202 B1 | 12/2014 |
| FR | 2381967 | 9/1978 |
| GB | 887202 | 1/1962 |
| NL | 7703915 | 10/1977 |
| WO | 2001061254 | 8/2001 |
| WO | WO-03/004942 A1 | 1/2003 |
| WO | WO2004027098 | 4/2004 |
| WO | 2016171164 | 10/2016 |
| WO | 2018205043 | 11/2018 |

* cited by examiner

METHOD FOR OPERATING A RECEIVER AND RECEIVER FOR CARRYING OUT THE METHOD

The present invention relates to a method to operate a receiver and a receiver to carry out the method.

Receivers are used in solar power plants. They collect the concentrated solar radiation and, by means of this, they heat a heat-transporting medium, via which the acquired heat is utilized in a subsequent technical process, whether this be via the conversion into mechanical power, for example, by propelling turbines, for carrying out processes requiring heat in the field of indus-try or for heating, for example, the district heating of inhabited areas.

In solar tower power plants, primarily receivers designed as pipe bundles are used, which are suitable for temperatures of up to 600° C. and sunlight concentrations of 600. For higher temperatures, primarily spatially designed receivers are used, which are designed for sunlight concentrations of 600, 1000 or more. Such temperatures are generally over 600° C., reaching 800° C. to 1000° C. and more, and, in the near future, will be able to reach a range of 1200° C. to 1500° C. Such receivers can, however on a smaller scale, also be used for dish concentrators. In the present document, receivers are referred to as spatial receivers if their dimensions are comparably large in all three dimensions in contrast to pipe-shaped receivers that are used in connection with trough or trough collectors. Such pipe-shaped receivers possess one dimension; namely length, which is a great deal more, at a range of ten times or one hundred times more, than the cross-section dimensions width and height. Receivers for trough collectors are not designed for the aforementioned temperatures since the trough concentrator concentrates in two dimensions with reference to the receiver, however, the field of heliostats con-centrates in three dimensions in the case of a tower power plant or a dish concentrator.

Such receivers are known to the person skilled in the art as volumetric receivers, which are also suitable for solar tower power plants, wherein, in such receivers, the required temperatures can reach more than 500° C., or more than 1000° C., for example, up to 1200° C. However, the high operating temperatures lead to considerable effort on a constructional level.

Volumetric receivers possess an extended (voluminous, therefore the term "volumetric" receiver) absorber structure, which, for example, can be composed of a voluminous wire mesh or an open-porous ceramic foam. The concentrated solar radiation then penetrates into the interior space of the (voluminous) absorber structure and is absorbed there. The heat-transporting medium, such as air or a suitable reactant for a subsequent reactor is led through the open-porous absorber structure and, in this way, absorbs by means of forced convection at the open-porous absorber structure. The absorber structure can also consist of a pipe structure, a graduated lattice structure or any structure in itself with a large surface, which causes the heat transfer from the absorber structure to the heat-transporting medium, if this flows through the absorber.

For example, a volumetric receiver became known due to the REFOS project (Receiver for solar-hybrid gas turbine and combined cycle systems; R. Buck, M. Abele, J. Kunberger, T. Denk, P. Heller and E. Lüpfert, in Journal de Physique IV France 9 (1999)), which will be described in more detail below in conjunction with FIG. 1.

Such receivers have the disadvantage that the absorber structure is complicated to manufacture and the flow running through the absorber may become instable, in particular, due to an undesired temperature distribution occurring during operation.

Accordingly, it is the object of the present invention to create an improved receiver.

By means of the fact that, according to the method according to the invention, the selected heat-transporting gas is absorptive within the frequency bands belonging to the infrared range and the operating parameters are configured in such a way that a substantial part of the heat increase occurs due to the absorption in the gas-transporting heat, a simplified concept of the receiver can be implemented since the heat transfer only takes place at a reduced level due to convection.

By means of the fact that the absorption arrangement is designed as a blackbody radiation arrangement with reduced convection, the design of the absorber is simplified and thereby the construction and operation of the receiver is too since the absorber no longer must emit the heat introduced via the solar radiation in an absorptive manner across its depth to the gas-transporting heat.

Preferred embodiments have the features of the dependent claims.

The invention is explained in more detail below based on the figures.

Figure 1B:
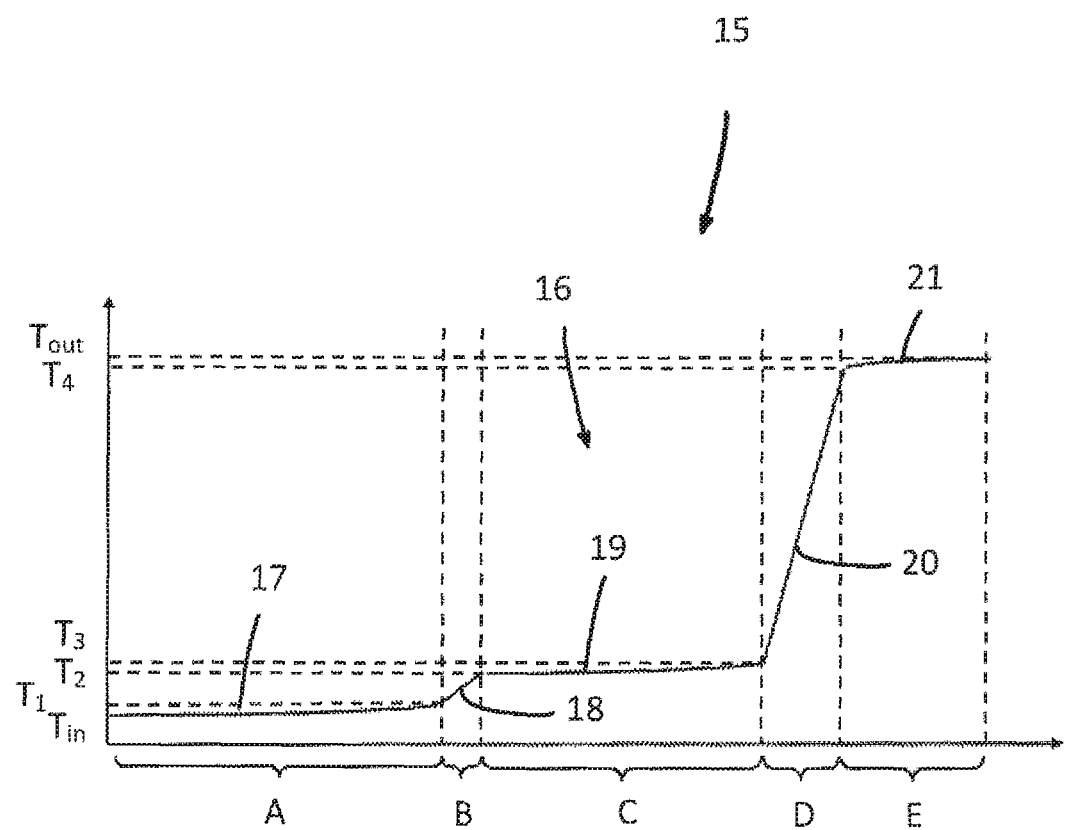
Figure 2:
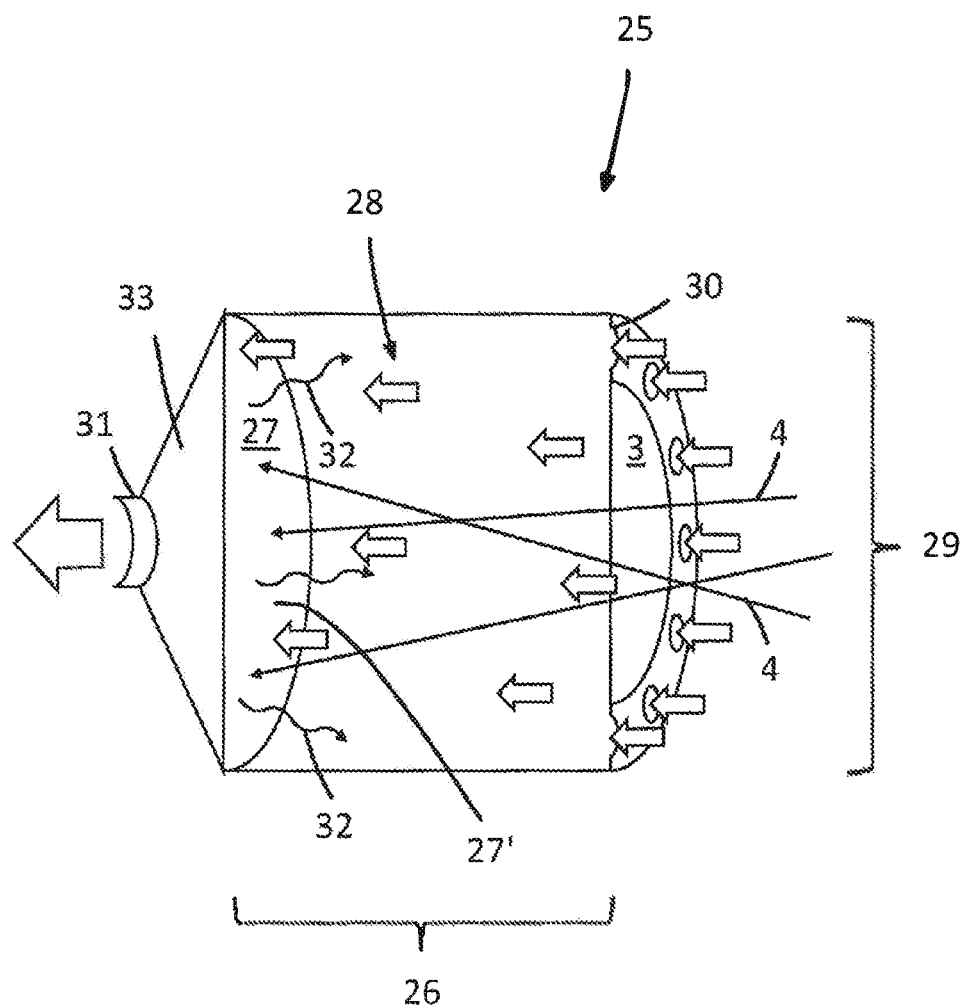
Figure 3:
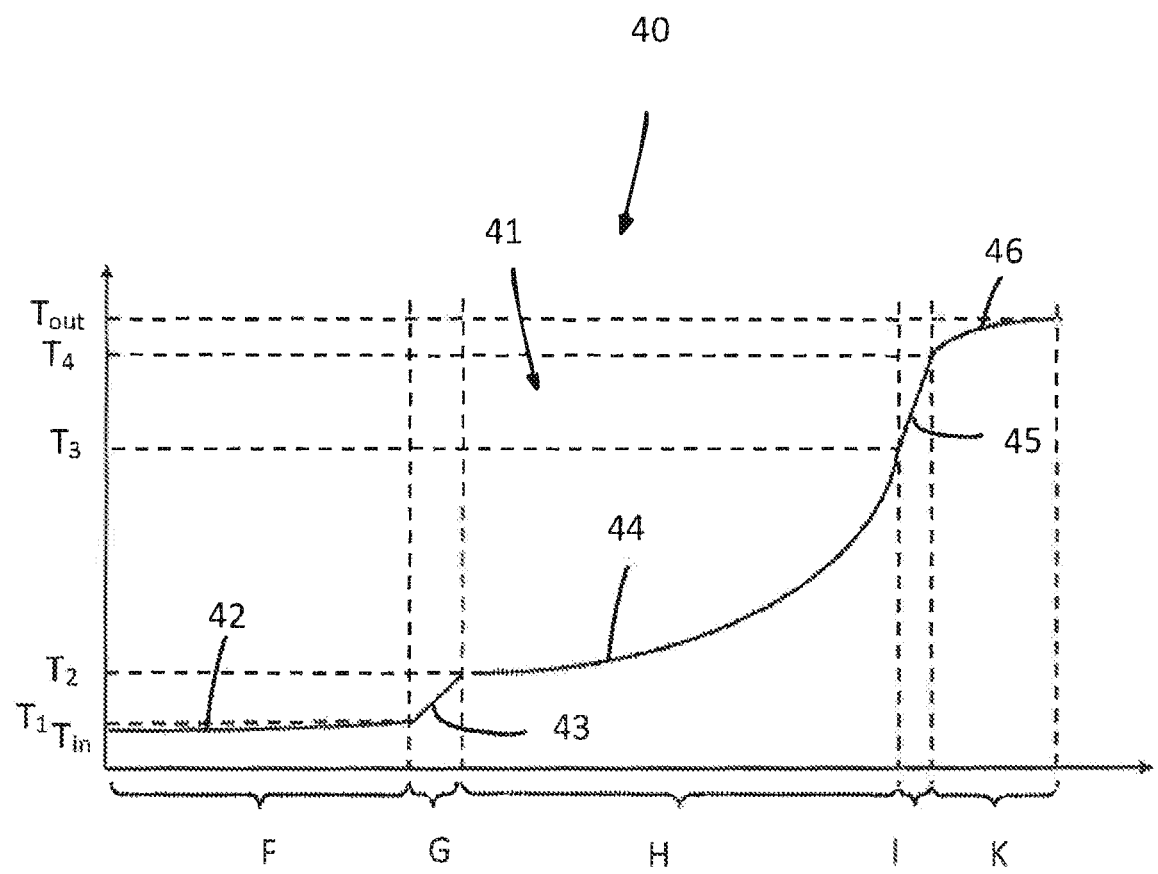
Figure 4:
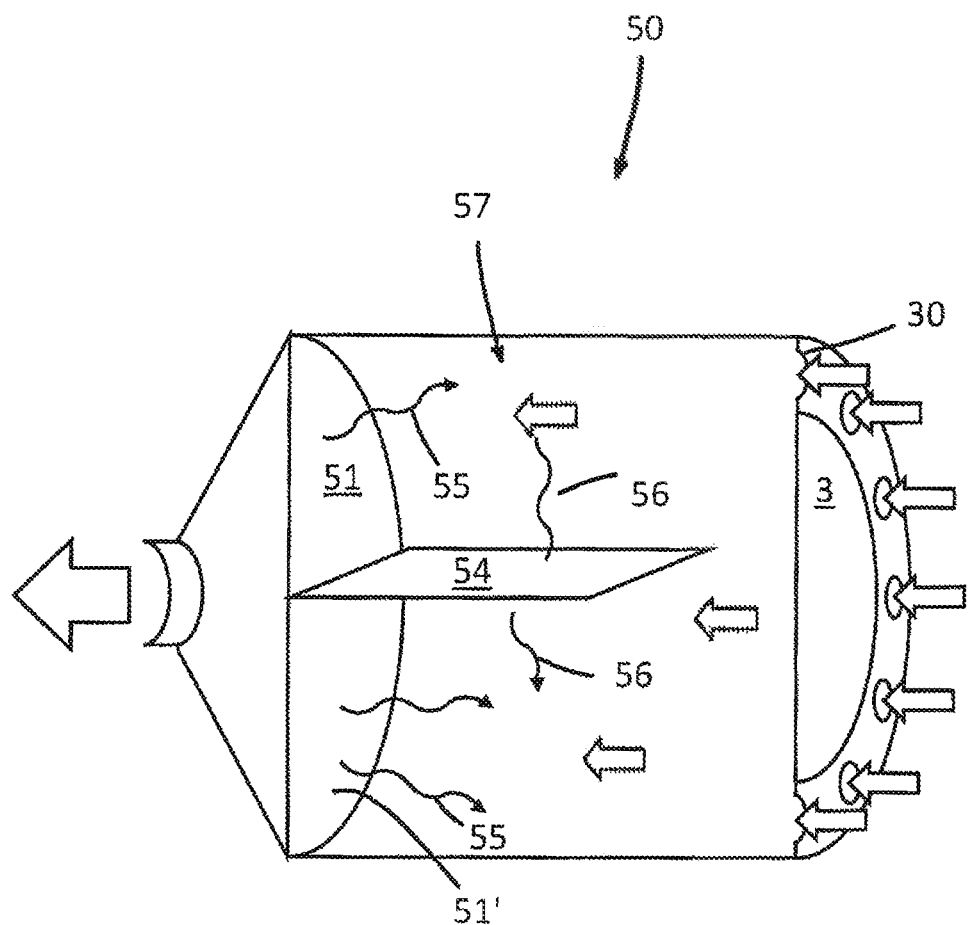
Figure 5:
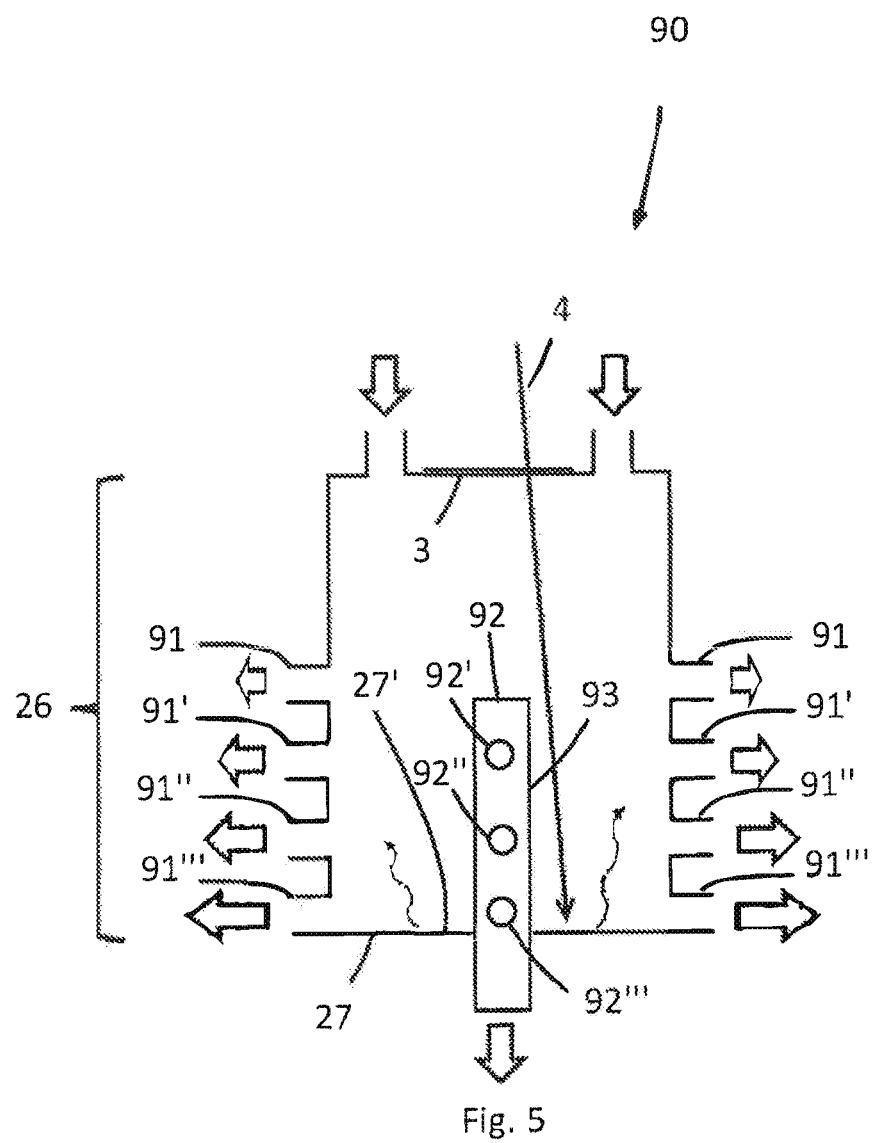
Figure 6A:
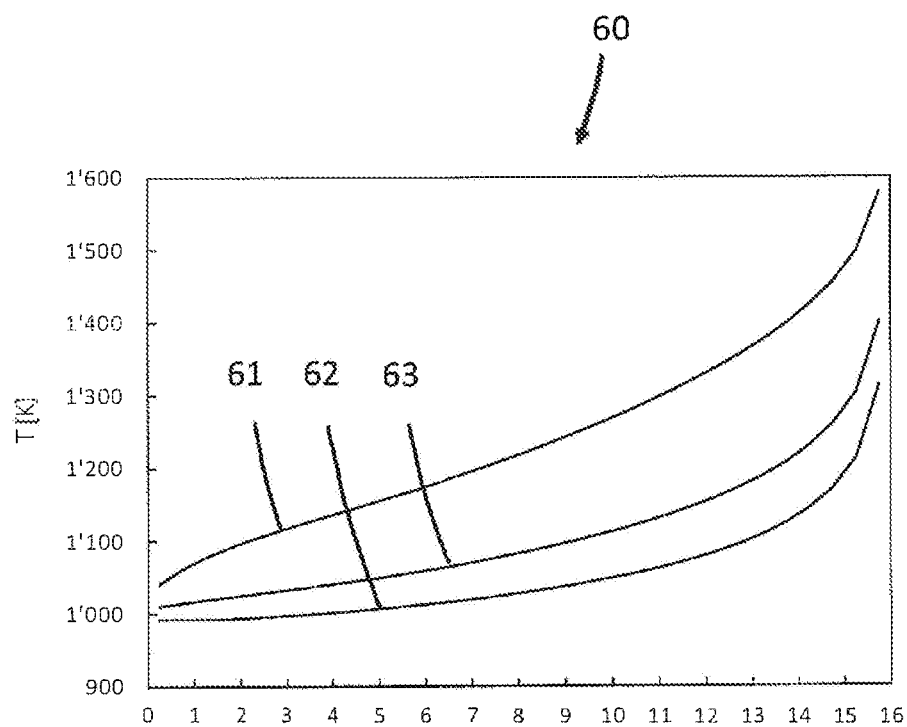
Figure 6B:
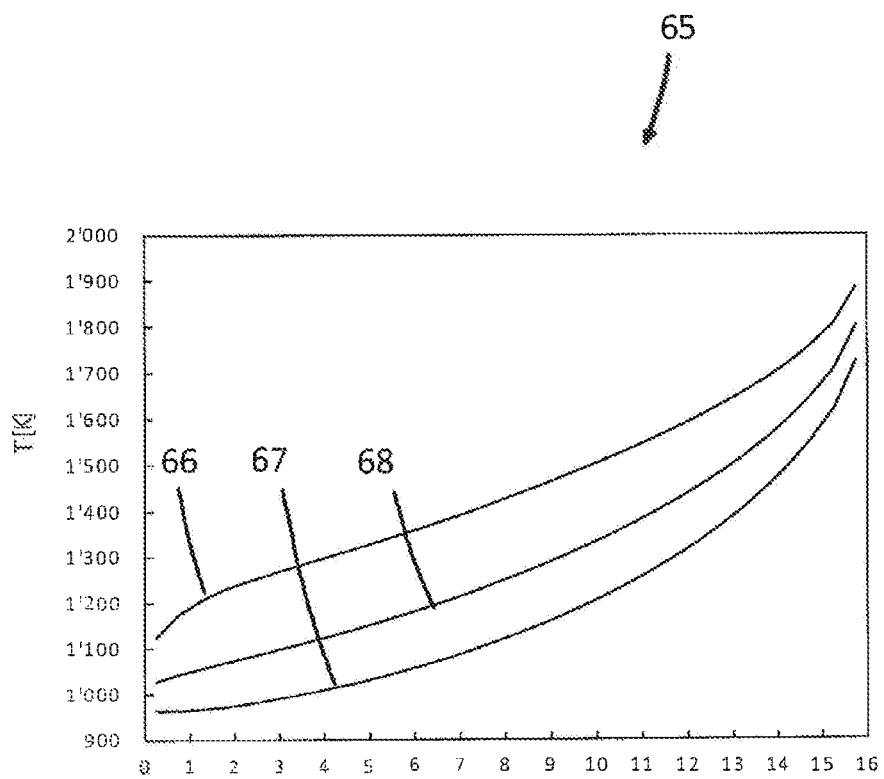
Figure 7A:
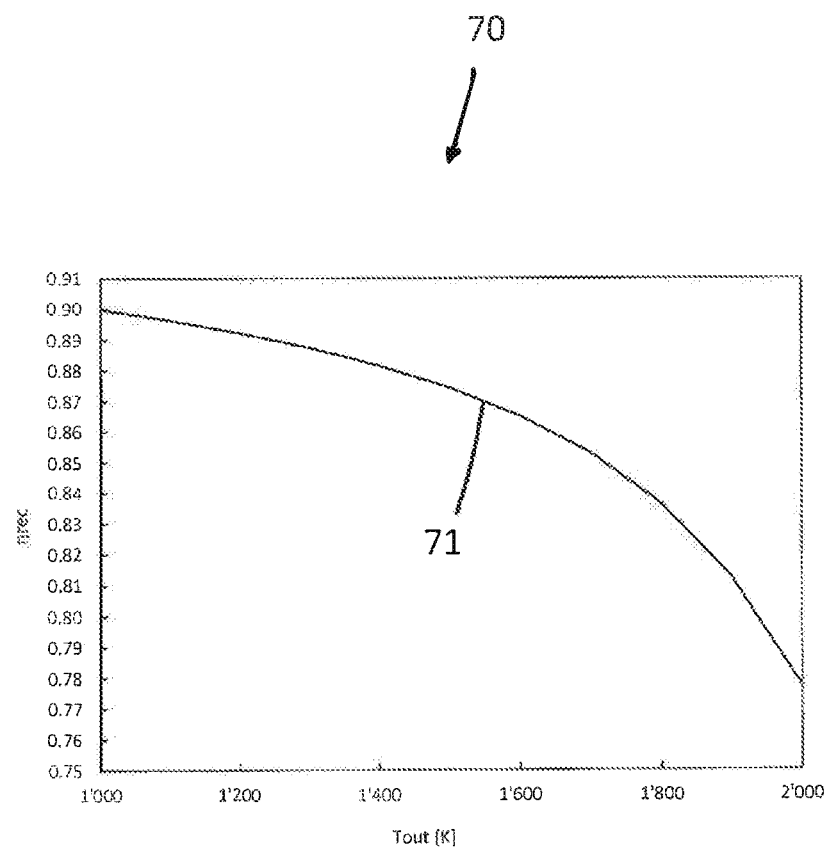
Figure 7B:
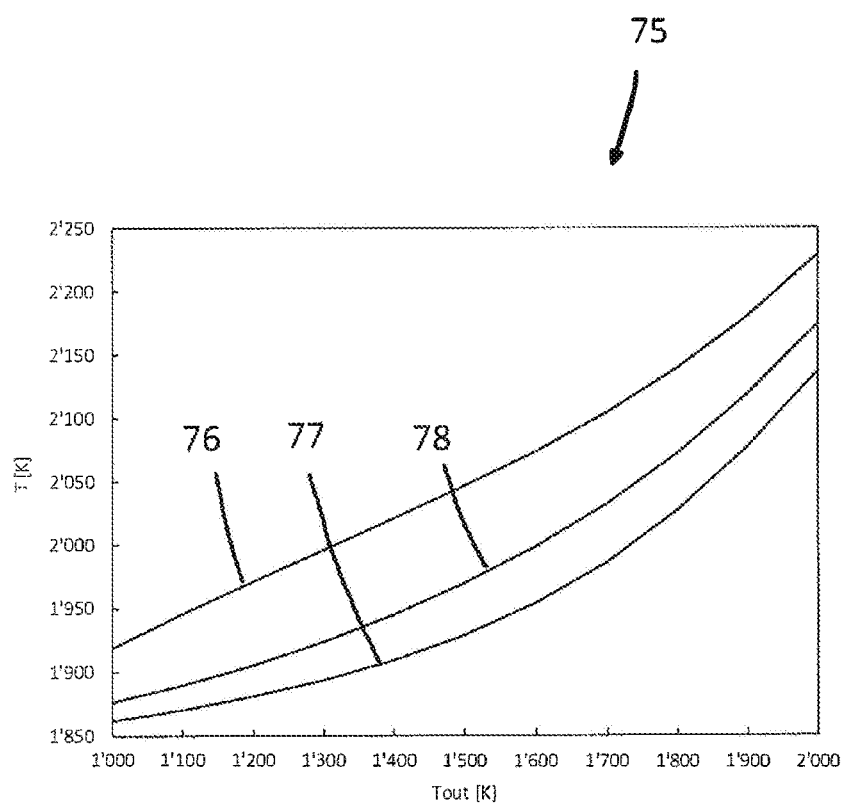
Figure 7C:
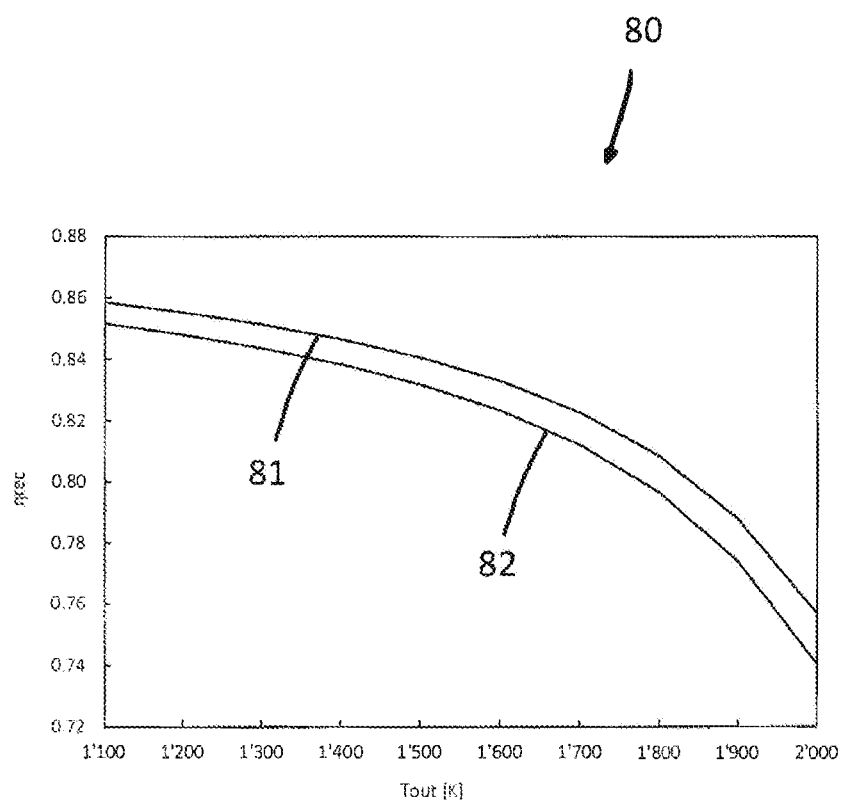
Figure 8:
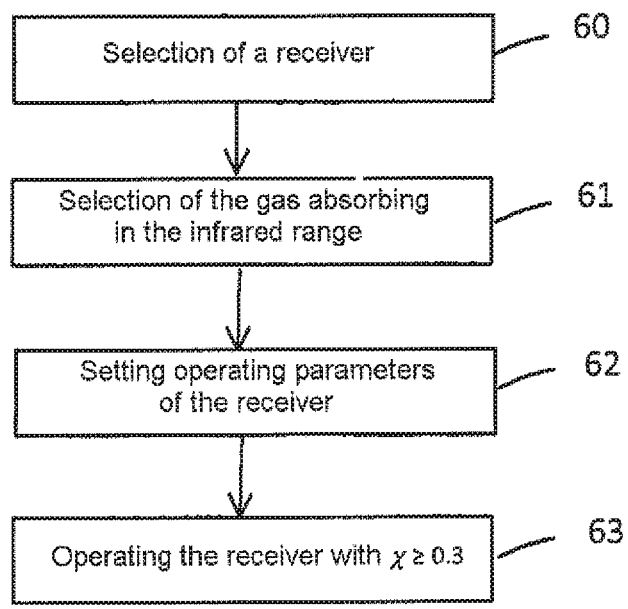
Figure 9:
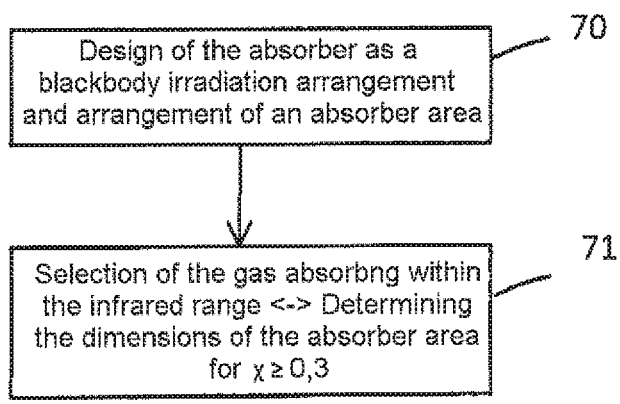

The Figures Show:

FIG. 1a a receiver according to the most recent background art,

FIG. 1b schematically, a diagram with the temperature profile in the receiver of FIG. 1a, FIG. 2 schematically, a receiver according to the present invention in a longitudinal section, FIG. 3 schematically, a diagram with the temperature profile in the receiver from FIG. 2, FIG. 4 schematically, an embodiment of the receiver according to the invention, FIG. 5 schematically, another embodiment of the receiver according to the invention, FIGS. 6a and 6b diagrams with the temperature profile in a receiver according to the invention, FIG. 7a to *c* diagrams with the degree of effectiveness as well as the temperature of the absorbing surface in a receiver according to the invention FIG. 8 the steps of an operating method according to the invention for a receiver, and FIG. 9 the steps of a production method for a receiver according to the invention.

FIG. 1a shows an experimental arrangement for a volumetric receiver 1 according to the REFOS project with a heating area 2 for heating a heat-transporting medium, here, air, which has an opening 3 formed as a quartz window for the radiation of the sun or sunlight 4 and an absorber 5 absorbing this radiation 4 arranged in the path of the incidental radiation 4 behind the quartz window 3. A transport arrangement 6 for the transport of the heat-transporting medium through the heating area 2 has an inlet 7 in the embodiment shown, through which the medium arrives into the receiver 1 with an inlet temperature $T_{in}$ and an outlet 8, through which it leaves this with the outlet temperature $T_{out}$.

Via the edge ducts 9 of the transport arrangement 6, the air is guided to the front side of the receiver 1 with the inlet temperature $T_{in}$, where it arrives through suitably formed openings 10 into a distribution area 11 lying in front of the absorber 5; it is distributed and afterwards flows through the absorber 5, thereby being convectively heated by it and then going into a collection area 13 with a temperature $T_{out}$ and from there, into an outlet 8, through which it then leaves the receiver 1. The quartz window 3 is arched toward the inside so that the receiver 1 can be operated with increased pressure so that the heated air under pressure can be supplied to a downstream consumer, for example a turbine.

The absorber 5 tracking the contour of the quartz window 3 in a space saving manner and constructed as a volumetric absorber has a number of layers of a fine wire mesh, in which the sunlight 4 can deeply penetrate so that the absorber 5 heats up across its entire depth and thereby, the air flowing through it is convectively heated to $T_{out}$. As mentioned above, a conventional absorber in other embodiments consisting of an open-porous ceramic foam or another arrangement with a very large surface in comparison to the air volume located within the absorber in order to achieve the required convective heat transfer.

An insulation 12 surrounds the receiver 1, to which a secondary concentrator, which concen-trates the flow of the solar radiation 4 toward the quartz window 3 and is left out in order not to overburden the figure is connected in front of its optical opening 3. In order not to overburden the figure, furthermore, a control system for the receiver 1 and the transport arrangement 6 has been left out, via which the operation of the receiver 1 and the supply/discharge of air is suitably regulated as is known to the person skilled in the art. A receiver like the REFOS receiver shown allows for an outlet temperature $T_{out}$ of 800° C. to be reached, with a ceramic absorber, a temperature of 1000° C.

FIG. 1b shows a diagram 15 with a temperature curve 16, which, in conjunction with FIG. 1a, schematically shows the temperature profile of the air flowing through the receiver 1. In Section A, a low convective heating of air from $T_{in}$ to $T_1$ (part 17 of the temperature curve 16) takes place from the inlet 7 to the end of the edge ducts 9. In Section B, a first relevant and convective heating from $T_1$ to $T_2$ (part 18 of the temperature curve 16) during the passage of air through the openings 10 in the absorber 5. In Section C, meaning in the distribution area 11, the air heats in an absorptive manner, but just a little, since air as a gas mixture contains a small amount of $CO_2$ (or another gas), which absorbs in the infrared range, however otherwise is primarily translucent for infrared radiation (part 19 of the temperature curve 16). Ultimately, in Section D, the air flows through the absorber 5, where it is convectively heated to the temperature $T_4$, which corresponds to the outlet temperature $T_{out}$ (part 20 of the temperature curve 16). In Section E, the air arrives through the collection area 13 into the outlet 8, wherein, in turn, a low absorptive temperature increase results due to the infrared-absorbing gas component. The temperature jump from $T_{in}$ to $T_{out}$ is primarily due to convection.

FIG. 2 schematically shows an exemplary embodiment of a receiver 25 according to the invention designed as a spatial receiver with a heating area 28, which has an opening 3 for the radiation of the sun, for example, a quartz window, and an absorber 27, which is plate-shaped here, wherein an absorption area 28 is proved between the quartz window 3 and the absorber 27, which the heat-transporting medium flows through from right to left according to the drawn-in arrows, meaning against the absorber 27. In addition, the transport device 29 has inlet nozzles 30 arranged around the quartz window 3 for heat-transporting medium, which lead into the absorption area 28, and a central outlet nozzle 31 behind the absorber 27. In order not to overburden the figure, here, as is the case in the following figures, the insulation of the receiver has been left out According to the invention, the absorber 27 is designed as a blackbody radiation arrangement, meaning, it possesses a surface 27' arranged in the path of the incidental sunlight or the incidental solar radiation 4 that absorbs this radiation and is designed in such a way that it operationally heats up due to the incidental solar radiation 4 falling on the surface 27' and then emits infrared radiation into the absorber area 28 across its surface 27'.

Thereby the absorber 27 emits a substantial portion of its heat power into the absorber area 28 in the form of infrared radiation, where the heat-transporting medium flowing toward it already heats up to $T_{out}$ to a great extent or predominately in an absorptive manner before it reaches it.

A real structure only radiates approximately like the ideal blackbody does. In the present, under a "blackbody radiation arrangement", it is understood that the incidental solar radiation 4 is absorbed on the surface of the absorber to the furthest extent possible (meaning primarily only penetrating into the absorber a little bit in contrast to the known volumetric absorbers) so that this surface heats up to a high temperature and, by means of this, it radiates like a blackbody into the absorber area 28 with the high temperature concerned with another frequency spectrum with relation to the solar radiation. The primary proportion of the blackbody radiation emitted into the absorber area 28 is in the infrared range at absorber 27 temperatures of up to 2000° K (or also above this), meaning, as mentioned, at lower frequencies with relation to visible light.

In other words, the absorber according to the invention is designed to be cooled via its blackbody radiation to the extent that the ratio x can be reached (for more information, please see the description below).

A complex absorber structure, in particular, being provided for volumetric receivers and being graduated across its depth, which also absorbs incidental solar radiation or radiation from the sun across its depth accordingly while this is at least partially scattered within its interior space and is increasingly absorbed after reflection has occurred a multiple of times, is thereby done without. Thereby, complex thermal problems that frequently occur in the case of such absorber structures are also done without.

Thereby, it is furthermore preferred if the absorber 27 is designed for a low level of convection to take place, meaning, for example, it can be easily flowed through without increased convective properties being of importance for the heat exchange. With that, the design for maximized convection of the flowing medium is also done without, meaning the structure necessary for a heat exchanger that is as efficient as possible along with a large surface in comparison with the flowing volume of the heat-exchanging medium, also meaning the surface is manufactured in a complex and therefore cost-intensive manner at a high level of efficiency and, during operation, results in a considerable drop in pressure of the flowing medium, which, in turn, is disadvantageous for the corresponding receiver's degree of efficiency.

On this note, it must be mentioned that a certain convective heat transfer at the absorber 27 caused by coming into contact with the heat-exchanging medium naturally cannot be avoided, in particular, in the case of the embodiment shown in FIG. 2 since this forms a wall section of the absorption area 28 there. The corresponding convective heat transfer to the heat-transporting gas is in itself of course welcomed as is the case with any heat transfer—however, the outlet temperature $T_{out}$ should be based on absorption to a primary or predominant extent (see below for more information) and thereby making a simplified construction of the receiver 25 possible. As mentioned above, the simplified construction of the absorber 27, among other things, opens up the possibility for inexpensive manufacturing (low-cost receiver for high temperatures) and also a more stable operation, for example, from a thermal point of view (temperature distribution via the absorber 27), which results in an increased level of industrial suitability of the receiver.

According to the invention, a receiver results with a heating area for heating a heat-transporting-medium, which has an opening for the radiation of the sun, and an absorber arranged in the path of the incidental radiation of the sun, thereby absorbing this solar radiation, with a transport arrangement for the transport of the medium through the heating area, wherein an absorption area for heating the heat-transporting medium is provided outside of the absorber and the absorber is designed as a low-convection blackbody radiation arrangement and the transport arrangement is designed for the transport of a gas as a heat-transporting medium.

Thereby, the absorber designed as a low-convection blackbody radiation arrangement is preferably designed for the flow through of the heat-transporting gas and it is furthermore preferably located opposite to the optical opening 3.

Furthermore, as is shown in FIG. 2, the absorber area 28 is preferably provided between the opening 3 for the radiation of the sun and the absorber 27, wherein the ratio x is the ratio of the temperature increase ($T_3$-$T_2$) due to absorption of the radiation of the absorber 27 in this absorber area 28 to the entire temperature increase ($T_4$-$T_2$) due to the absorption and convection at the absorber 27 after the gas has gone passed this. The gas has then gone through the absorber 27 if it has either just passed through the absorber 27, and thus reaches the collection area 33 or if it is has been directly removed on the side where the absorber 27 is located (for example, through openings 92''' or 93''' according to FIG. 5), wherein, naturally, in a specific embodiment, both possibilities can be provided simultaneously.

In another embodiment, which is not shown in the figure, the collection area 33, which is located on the back side of the absorber 27, is designed as another absorber area. In the case of an at least partially gas-tight absorber (see below), gas is led around the absorber to a back side of the absorber then led away from this.

Then, the heat-transporting gas, which has already been heated in an absorptive and convective manner, flows through this other absorption area and additionally heats up in an absorptive and convective manner, preferably, according to the invention, at a temperature ratio x≥0.3. This ultimately allows for the radiating surface 27' to become larger, thereby optimizing absorptive heat transfer.

Thereby the heating area has two absorber areas with a joint absorber, wherein the ratio x is provided for one or for both absorber areas.

Furthermore, according to the invention, an infrared-absorbing gas or gas mixture is used as a heat-transporting medium, which absorbs in frequency bands belonging to the infrared range. For example, such gases are heteropolar gases, preferably $CO_2$, water vapor, $CH_4$, $NH_3$, CO, $SO_2$, $SO_3$, HCl, NO, and $NO_2$, or a mixture therefrom, such as a mixture of water vapor and $CO_2$. When using such gases, ultimately, a greenhouse effect, which can be used by the receiver 25 or is used, results since these gases are highly translucent for the visible light that thereby primarily reaches the absorber 27, however are only a little bit to hardly translucent for the infrared radiation of the absorber so that they heat up in an absorptive manner as regards $T_{out}$ in front of the absorber 27 to a considerable or predominate extent. Here, it must be mentioned that real gases do not absorb visible light or infrared radiation evenly across all frequencies and are not evenly transparent to these, but, above all, do so unevenly in frequency bands specific for a respective gas. In addition, the absorption declines as the distance from the radiation source increases. By means of this, with regard to the absorption or the transparency of radiation, mention is made above of "highly translucent" or from "a little bit to hardly translucent".

It must be further mentioned that, naturally, the radiation of the sun has a proportion of infrared frequency bands, provided that theses enter through the atmosphere to the earth's surface. Thanks to the heating area 28 being designed in such a way that this is just a little bit to hardly translucent for infrared frequencies, this proportion (which is in comparison small) contributes to heating the heat-transporting fluid directly via the absorber 27 without making any detours according to the invention, thereby being highly efficient. This is in contrast to conventional receivers, where the infrared proportion of the solar radiation primarily heats the absorber and then is emitted to the heat-transporting fluid in a predominately convective manner.

The absorber according to the invention can be designed as a perforated plate, preferably as a double perforated plate or as a simple flat mesh structure. In the case of the perforated plate, a perforation pattern is distributed across the extent of it so that the heat-transporting gas can easily flow, however, thereby providing enough or as much of surface of the perforated plate or as much surface as possible for the absorption of the incidental solar radiation and the infrared back radiation into the absorber area. In addition, the perforation pattern can be designed for easy flow-through since the necessity of convention is no longer applicable and a low level of flow resistance is advantageous. The person skilled in the art can easily determine the perforation pattern in specific cases in an optimum manner. This also in the case with a mesh structure or a double perforated plate with two plates that are parallel to each other, wherein then the perforations of the one plate are arranged offset to each other with regard to those of another plate in such a way that, despite the low-convection passage of the heat-exchanging gas, a radiating surface of the absorber, which is as constant as possible, faces the absorption area. In this case, the gas is led through the absorber. As an alternative, the absorber can also be designed to be gas-tight, wherein then, the gas flows out of the absorber area 28 from the side, as is shown in FIG. 5. Then, the gas is led past the absorber. In specific cases, the person skilled in the art can provide for a mixed form so that part of the gas flows through the absorber and part flows past it. The absorber then has an at least partially gas-tight surface and is preferably plate-shaped (a surface is fully gas-tight if the gas is led past the absorber).

A suitable material for the absorber has both a high degree of absorption of solar radiation as well as a high emissivity of infrared radiation, which—if required—can be additionally increased by suitably texturing the surface 27' with, for example, V-grooves, pyramids protruding into or out of the surface, or other radiation traps. In addition, high-temperature(change) and corrosion resistance (e.g. against oxidation due to water vapor or $CO_2$ in the case of high temperatures) are required. Suitable materials include both high-temperature ceramics such as silicon carbide (SiC), as well as fire-proof materials, which the person skilled in the art can, among other things, choose in specific cases with regard to the provided temperature range.

According to the invention, a receiver with a heating area for heating a heat-transporting medium results, which has an opening for the radiation of the sun, and an absorber arranged in the path of the incidental radiation of the sun, thereby absorbing this solar radiation, with a transport arrangement for the transport of the medium through the heating area, characterized in that, furthermore, an absorption area for heating the heat-transporting medium is provided and the absorber is designed as a radiation arrangement having an impact into the absorber area and the transport arrangement is designed for the transport of a gas as a heat-transporting medium, wherein the heat-transporting medium is primarily a gas absorbing in frequency bands belonging to the infrared range, and the absorber area interacting with the absorber is dimensioned in such a way that, during operation, the ratio x of the temperature increase $(T_3-T_2)$ of the heat-transporting gas absorbing in frequency bands belonging to the infrared range due to absorption in the absorber area to the temperature increase $(T_4-T_2)$ due to absorption and the convection at the absorber is ≥0.3.

Thereby, according to the selection of the person skilled in the art in specific cases, the receiver according to the invention can be designed in such a way that the temperature increases during the transport through the heating area due to absorption of the radiation of the absorber in such a way that the ratio x of the temperature increase $(T_3-T_2)$ to the entire temperature increase $(T_4-T_2)$ due to the absorption of the radiation of the absorber and convection at the absorber is ≥0.3.

FIG. 3 shows a diagram 40 with a temperature curve 41, which, in conjunction with FIG. 2, schematically shows the temperature profile of the gas flowing through the receiver 25.

In Section F, through part 42 of the temperature curve, the heating of the infrared-absorbing heat-transporting gas from $T_{in}$ to $T_1$ is shown for the case that the infrared-absorbing gas in the embodiment of the receiver 25 shown in FIG. 2 should also be transported along the absorption area 28, as is the case with the receiver 1, to the front side as was the case with the air (FIG. 1). In Section G, a low convective heating of air from $T_1$ to $T_2$ (part 43 of temperature curve 41) takes place due to the passage of the gas through the inlet nozzles 30.

In Section H, the infrared-absorbing gas flows through the absorption area 28 and heats up in an absorptive manner due to the infrared radiation 32 of the absorber 27 (here, with the infrared proportion of the solar radiation) from $T_2$ to $T_3$ (part 44 of the temperature curve 41) before it flows through this in Section I, thereby heating in a convective manner from $T_3$ to $T_4$ (part 45 of the temperature curve 41). Ultimately, another absorptive heating of the infrared-absorbing gas in Section K from to $T_4$ to the output temperature $T_{out}$ occurs (part 46 of the temperature curve 41) while the gas is located in the collection area 33 and flows against the outlet nozzle 31. According to the invention, the temperature jump from $T_{in}$ to $T_{out}$ is primarily absorptive to a great or predominant extent.

From the representation in FIGS. 2 and 3, it occurs that the transport arrangement of the receiver preferably has an absorption area 28 in the flow direction in front of and another (here, designed as a collection area 33) absorption area in the flow direction behind the absorber 27.

The person skilled in the art determines operating parameters for the specific case at hand, generally based on the desired or required outlet temperature $T_{out}$ and the inlet temperature $T_{in}$ that is given due to the use of the heat from the receiver. Furthermore, for the specific case at hand, he chooses an appropriate infrared-absorbing gas or gas mixture and determines the flow rate in the absorption area 28 (which can, in turn, be dependent on the current solar radiation). Such operating parameters and other parameters that result in specific cases can depend on one another with the consequence that the absorptive increase of temperature from $T_2$ to $T_3$ in Section H in FIG. 3, meaning in the absorption area 28, can turn out to be greater or lower depending on the specific case at hand.

The applicant has found that the advantages according to the invention already have relevant impact at a ratio x of ≥0.3, wherein, $$x = \frac{T_3 - T_2}{T_4 - T_2},$$

meaning the ratio between the absorptive and the entire absorptive and convective heating of the heat-transporting gas indicates when the gas has flowed to an absorber 27 radiating in the infrared range and then has flowed through this (or has flowed along it to an outlet), meaning it has passed this. By means of appropriate operation with the selected parameters, in other words, by means of an appropriate design of the control system of the receiver 25, the person skilled in the art can reach the value according to the invention of x≥0.3 in specific cases.

The person skilled in the art can, as mentioned, refer the ratio x≥0.3 to the absorption of only the absorber radiation 32, 55 or to the absorption of the absorber radiation including the absorption of the infrared proportion of the solar radiation 4 running through the absorption area 28, 57 (FIGS. 2 and 4).

According to the invention, this results in a gas absorbing in the frequency bands belonging to the infrared range being provided as a heat-transporting medium. Furthermore, according to the invention, this results in an absorption area that interacts with the absorber being dimensioned in such a way that, during operation, the ratio x of the absorptive temperature increase $(T_3-T_2)$ of a heat-transporting gas in the absorption compartment that absorbs within frequency bands belonging to the infrared range to the entire temperature increase $(T_4-T_2)$ due to the absorption and convection at the absorber is >0.3.

Preferably, the heat-exchanging-gas flows through an absorber zone (absorption area 28) against an absorber (absorber 27), wherein it is heated in an absorptive manner within the absorber zone and also in a convective manner by the absorber. A receiver can be constructed in a multilevel manner, meaning heating a heat-transporting medium step-by-step. According to the invention, at least one step is designed for absorptive/convective heating with the ratio X of ≥0.3.

If so, the heating area has preferably two absorption areas, wherein the ratio x for one or for both of the absorption areas is provided in connection with the absorber.

For a high degree of efficiency of the receiver according to the invention, it is a decisive factor that the amount of heat emitted by the absorber is absorbed in the absorption area by the heat-transporting gas to the furthest extent possible (and for example, does not penetrate the gas and deviate through the opening for the solar radiation as back radiation again from the receiver). A decisive parameter here is the absorptivity a of the heat-transporting gas, which can be measured by testing, can be calculated from spectral line values deriving from molecular-spectroscopic databases (e.g. HITEMP2010) or can approximately be determined from emissivity diagrams according to Hottel's rule. If, under the current operating conditions, the receiver in an embodiment has a distance H between the absorber and the opening in such a way that the heat power of the heat-transporting gas emitted by the absorber is absorbed within this region at 60% or more, a good degree of efficiency of the receiver already results, which is construed for the absorption of the absorber heat. It is particularly preferred if a height in the mentioned region is such that 80% or more, particularly preferred 90% or more of the emitted heat power of the absorber is absorbed by the heat-transporting gas.

Here, it must be mentioned that the absorber area surely has an opening for the radiation of the sun and an absorber acting within it via its blackbody radiation, wherein, according to FIGS. 2 and 4, the absorber preferably lies opposite to the opening. In principle, the absorber area can also not be cylindrical, but be shaped in any way, for example, with inset sidewalls so that the opening is smaller than the absorber surface, which is favorable with regard to the undesired back radiation. In such a case, the radiation is bundled in the opening by a concentrator and diverges after the opening in such a way that the entire absorber surface, which is larger, is illuminated. Then, the absorber area possibly does not have such a height under the inset walls but under the opening that an absorption exists at the aforementioned degree in the region concerned (where this level is present).

Since the absorptivity is dependent on the type of gas, its pressure and the temperature of the radiating absorber surface and the temperature of the gas self (Hottel's rule), the person skilled in the art can determine the height depending on the parameters determining the absorption: as mentioned, this includes the type of gas, it's operating pressure, it's temperature and the temperature of the absorber surface during operation, which determines an operational state of the receiver to this extent.

A preferred embodiment of the receiver according to the invention results, where the absorption area has a height above the absorber in such a way that, during an operational state of the receiver in this region 60% or more, preferably 80% or more, quite particularly preferred 90% or more of the heat power emitted by the absorber is absorbed by the heat-transporting gas.

FIG. 4 shows another embodiment of the receiver according to the invention. A section through a receiver 50 is shown, which corresponds to the receiver 25 in FIG. 2, wherein, however, the absorber 51 with its absorbing surface 51' facing the optical opening 3 has a preferably plate-shaped Section 54 projecting into the absorber area 57, which extends against the opening 3 in the middle of the absorber area 57 and which is primarily aligned in parallel to the flow direction of the infrared-absorbing heat-exchanging gas indicated by the arrows drawn in. Section 54 primarily absorbs infrared radiation emitted by the absorbing surface 51' provided that this has not been absorbed by the gas flowing along it, meaning in particular, radiation in those frequency bands, for which the gas is less absorptive. By means of this, it heats up and is, in turn a blackbody radiation arrangement, which radiates in the entire frequency spectrum corresponding to the temperature of the Section 54 and the gas-transporting heat flowing by is heated in an absorptive manner. An improved use of those frequencies of the radiation 55 result, which only absorbed by the gas only slightly since these frequencies introduce heat into Section 54, which then, in turn, radiates at all (infrared) frequencies. The section 54 represents a secondary absorber.

Such an arrangement can be designed in greater dimensions, for example, with a diameter of the absorber surface 51' being 15.96 m and a length of the absorption area 57 (absorber surface 51' to the optical opening 3) being 15.96 m. Then, the receiver 50 is suitable to absorb the flow of a greater number (or all) of heliostats of a tower power station. This results in the receiver 50 having an absorption area 57 and the absorber 51 with a section or a secondary absorber 54 projecting into this area, which is preferably plate-shaped.

In another embodiment, which is not shown in the figure, for example, a wall, which is translucent for the visible spectrum of the sunlight (borosilicate glass) can be provided as a secondary absorber, which is arranged approximately in the centre between the absorber surface 51' and the optical opening 3 (FIG. 4) parallel to the absorber surface 51' and has passages, for example in the type of a perforated plate, for the heat-transporting gas. In turn, the glass wall is heated by the infrared radiation of the absorber surface 51' and by its frequency proportions, which have not been yet absorbed by the gas and radiates in itself like a blackbody in both directions, namely both against the optical opening and also against the absorber. The person skilled in the art can design the glass plate in specific cases so that the ratio x of ≥0.3 is achieved for the section of the absorption area between the glass plate and the optical opening and the last plate assigned to it and also for the section of the absorption area between the glass plate and the absorber with the absorber assigned to it. According to the invention, a receiver results, which has a secondary absorber designed as a blackbody radiation arrangement with reduced convection in an absorption area lying in front of the absorber, which is arranged and designed in such a way that it can be heated by the infrared radiation of the absorber.

FIG. 5 schematically shows a cross-section through another embodiment of the receiver like the one in FIG. 2. The sun rays 4 fall through a window made of quartz glass 3 for example onto the absorber 27, the radiating surface 27' of which heats the gas flowing within the absorption area 26, wherein its temperature increases from the window 3 to the absorber 27. Accordingly, the gas can be removed via openings 91 to 91''' in the cylindrical wall of the receiver 90 at various temperatures. The arrows show the flow direction of the heat-transporting gas, wherein the arrows are drawn in longer at the openings 91 to 91''' according to the increasing temperature. As an alternative or together with the openings 91 to 91''', a line 93 projecting into the absorption area 26 for the gas can be provided, which then feeds gas at temperatures that are predominant at the location of the openings 92 to 92''' via openings 92 to 92'''. Above all, this is favorable if a downstream process carried out at different temperature levels is provided with heat by the receiver 90. Then, the transporting gas also at various temperatures can be led back to the receiver by this process so that, being furthermore preferable, other supply lines for the heat-transporting gas into the absorption area 26 of the receiver 90 are provided in the area of the openings 91 to 91''' and 92 to 92''' (which have been omitted in order to not overburden the figure).

A receiver results, where the transport arrangement has one or a plurality of lines 91 to 91''' and 92 to 92''' connected to an absorber area 26 for heat-transporting gas, which are arranged in such a way that partially heated gas is removed from the absorber area 26 and/or partially heated gas can be supplied to a location, at which the temperature of the gas in the absorber area 26 substantially corresponds to the temperature of the supplied partially heated gas.

Such supply and discharge lines for partially heated gas can be provided at an absorptive receiver according to the invention without its layout, especially that of the absorber 27, having to be modified. They lines can also be used or made inoperative without requiring a construc-tive modification due to the various heat transfer.

The applicant has found that a temperature ratio x≥0.5 is especially favorable if the partially heated gas is used, for example, when the partially heated gas is at a range of 1400 K, meaning at half the temperature difference, at an inlet temperature $T_{in}$ of 1000 K and an outlet temperature $T_{out}$ of 1800 K: the temperature layer T=1400 K is still at a purely absorptive range in the absorber area 26 and can be reached easily accordingly, in FIG. 5 through the openings 91 to 91" and 92 to 92".

FIGS. 6a and 6b as well as 7a and 7b show various operating parameters in a receiver according to FIG. 2 in accordance with a mathematical modelling of the receiver 25 in FIG. 2 of the applicant. The system has been modelled with the most precise method known today, namely "Spectral line-by-line (LBL) photon Monte Carlo raytracing", wherein the absorption coefficients originate from the HITEMP 2010 Spectroscopic Database. A receiver is modelled, the absorption area of which has a diameter of 15.96 m and a height of 15.96 m and the opening 3 has a diameter of 11.28 m. A surface of the absorbing surface 27' of 200 m² and a surface of the opening 3 of 100 m² results from this. As a heat-transporting medium, water vapor was adopted at a pressure of 1 bar, without a window in the opening 3. The radiation flux at the opening 3 is 1,200 kW/m² and at the absorbing surface 27 is 600 kW/m² (which has twice the surface compared to the opening 3). The absorbing surface 27' was adopted as a radiating blackbody, and, in contrast to FIG. 2, taken with a continuous flat and smooth surface so that the heat-transporting medium removed laterally out of the absorber area 26 through openings 91''' at the height of the absorber 27 like in accordance with FIG. 5.

Based on the diagrams 60 and 65, FIGS. 6a and 6b show the temperature profile during operation of the receiver 25 (FIG. 2) along its longitudinal axis, starting from the opening 3: on the vertical axis, the temperature in Kelvin is ablated, on the horizontal axis, the distance from the opening 3. The diagram 60, FIG. 6a, shows a process with an inlet temperature of 1,000 K and an outlet temperature $T_{out}$ of 1400 K. The diagram 65, FIG. 6b, also shows a process with an inlet temperature $T_{in}$ of 1,000 K, however an outlet temperature $T_{out}$ of 1,800 K.

Due to the walls heating during operation, a temperature distribution within the heat-transporting medium (here water vapor) with an elevated temperature at the edge of the absorber area 26 results so that the highest temperatures are present (on the wall) (temperature curves 61 and 66) at a certain cross-section within the absorber area 26 on the edge and the lowest temperatures (temperature curve 62 and 67) are present in the middle at the location of the axis of the cylindrical absorber area 28. The temperature curves 63 and 68 show the average temperature of the water vapor in the respective cross-section of the absorber area 28.

FIGS. 6a and 6b show the possible design of such receiver in accordance with FIG. 5 in addition to a proof-of-concept for an absorptive receiver.

FIG. 7a shows a diagram 70 for the degree of efficiency of the receiver 25 (FIG. 2). On the horizontal axis, the outlet temperature $T_{out}$ is ablated, wherein a constant inlet temperature $T_{in}$ of 1,000 K is assumed. The curve 71 shows the degree of efficiency of the receiver 25 depending on the outlet temperature $T_{out}$. The reduction of the degree of efficiency toward higher temperatures $T_{out}$ can be explained by the elevated (loss) back radiation out of the opening 3 caused by the higher temperatures—despite the constant inlet temperature $T_{in}$ of 1,000 K since a proportion of the back radiation comes from interior space of the absorber area (with elevated temperatures). Accordingly, the concept of absorptive receiver has a degree of efficiency that is equal to conventional convective receivers or a degree of efficiency that is even better with an increasing outlet temperature $T_{out}$.

FIG. 7b shows a diagram of 75 for the temperature of the absorbing surface 27' depending on the outlet temperature $T_{out}$. In turn, a temperature distribution exists with higher edge temperatures and a minimal temperature at the location of the axis of the cylindrical absorber area 28: Curve 76 shows the temperature at the edge of the absorbing surface 27' and Curve 77 shows the temperature in the middle. Curve 78 shows their average temperature. The temperature difference with a higher $T_{out}$ becoming smaller with relation to the absorbing surface 27' can be explained by the energy emission of the blackbody increasing to the fourth power of its temperature-with a relatively small temperature increase (here, by 300 K), the heat-transporting medium is heated to a massively higher extent (here, by 1,000 K). The concept of absorptive receiver therefore has considerable flexibility with regard to the provided temperature $T_{out}$: an absorber suitable for high temperatures can be equally used for different temperatures $T_{out}$, which is not the case with convective absorbers of the most recent background art and the concept of the absorptive low-cost-high-temperature receiver.

According to the modelling used, the conditions shown in FIGS. 6a, b and 7a, b also applied to a receiver 25 (FIG. 2) with smaller dimensions, however with elevated pressure within the heat-transporting medium.

FIG. 7c shows a diagram 80 for the degree of efficiency of the receiver 25 (FIG. 2), however with a window in the opening 3 and for various dimensions. The efficiency for the large dimensions of the receiver 25 is evident in accordance with the description for FIGS. 6a, b and 7a, b, see curve 82. Furthermore, the degree of efficiency for small dimensions (diameter and height of the absorber area 28=1,596 m, diameter of the window in the opening 3=1.128, corresponding to 1 m²) is apparent with a pressure within the heat-transporting gas of 10 bar, see curve 81. The slightly smaller degree of efficiency with relation to FIG. 7a can be explained by the reduced flow on the absorbing surface of 554.4 kW/m² instead of 600 kW/m² due to the window.

Therefore, according to the knowledge of the applicant, the dimensions of the receiver 25 and all of the embodiments of the absorptive receiver according to the invention can be easily scaled, wherein the pressure must be increased at the same ratio for a comparably high degree of efficiency or comparable temperature conditions in the case of decreasing the dimensions, here, for example, in the case of a reduction by the factor 10, the pressure grows by the factor 10. However, it seems that the degree of efficiency tends to increase slightly disproportion-ately as the pressure in the heat-transporting gas increases. The conditions for a pressure of 10 bar are shown in FIG. 7c. In specific cases, the person skilled in the art can provide the overpressure at a range between 2 and 20 bar, particularly preferred between 5 and 15 bar and quite particularly preferred, of 10 bar as mentioned in the above.

In the case of simulated embodiments according to FIGS. 6a to 7c, X is at a range >0.9 since the convection on the flat and smooth absorbing surface is very little. It is worth noting that convection generally cools the absorber somewhat and is therefore suitable for decreasing the losses causing a reduction in the degree of efficiency due to back radiation out of the opening 3, meaning to increase the degree of efficiency of the receiver. However, increased convection leads to increased pressure losses in the flowing gas (which, in turn, lowers the degree of efficiency) as well as resulting in an increase effort for the construction of the absorber. In particular cases, the person skilled in the art can determine the optimal ratio between absorption and convection, meaning a specified value for $$\chi = \frac{T_3 - T_2}{T_4 - T_2}$$ (see the description of FIG. 3) at a range $\chi \geq 0.3$.

According to the knowledge of the applicant, as mentioned, already a value of x=0.3 leads to a simpler design of the receiver according to the invention with a degree of efficiency, which corresponds to that of the known receivers designed according to the principle of convection (or is higher).

Since high absorber temperatures, but also of the sidewalls of the absorption area are favorable for the most intensive blackbody radiation as possible into the absorption area, cooling means of all kinds, in particular, cooling ducts, as provided for in receivers according to the state of the art, are omitted-such as either cooling ducts in the walls or the cooling ducts in the absorber ensuring convection. A receiver results where the walls of the absorption area and/or of the absorber are free of cooling means, in particular cooling ducts.

In a further embodiment not shown in the figures, the absorber is arranged opposite the optical opening 3 the same way the receiver 25 (FIG. 2) is and forms a wall area of the absorption area 28 (FIG. 2). In contrast to the receiver 25, the absorber is, however, not provided with cross-flow openings for the heat-transporting medium, but at least partly designed to be gas-tight for this so that the heated gas radially flows out of the absorption area at the height of the absorber. By means of this, the construction of the absorber is once again simplified; the ratio x can be increased to a higher value than 0.3.

By optimizing the embodiment in accordance with FIG. 2, or by means of a combination of this embodiment with other described features (an additional Section 54 of the absorber 51 according to FIG. 4, glass plate in accordance with the embodiment not shown in the figures, etc.), the person skilled in the art can increase the value of the ratio x from ≥0.3 to ≥0.4 and ≥0.5 or ≥0.6 or ≥0.7 or even to ≥0.8.

FIG. 8 shows the steps of a method for the operation of a preferably spatial receiver according to the present invention. At a first step 60, a suitable receiver is selected, for example, with a structure in accordance with FIG. 2, which has an absorber that can be heated by sunlight, against which a gaseous heat-transporting medium is led by a transport device in order to heat it through the absorber for the heat transport.

At a second step 61, a gas absorbing within the infrared range is selected as a heat-transporting gas, in particular a heteropolar gas or one of the gases $CO_2$, water vapor, $CH_4$, $NH_3$, CO, $SO_2$, SO3, HCl, NO, and $NO_2$ (or also a mixture of these gases) in order to absorb blackbody radiation of the absorber by absorption of the gas transported against the absorber already in front of the absorber, thereby heating the heat-transporting medium.

At a third step 62, the operating parameters of the receiver are set in such a way that, during operation of the receiver, the ratio x of the temperature increase of the heat-transporting medium by means of absorption in front of the absorber to the temperature increase by absorption and convection at the absorber is ≥0.3.

At a four step 63, the receiver is set into operation and run with the parameter x≥0.3.

A method results to operate a receiver with a heating area for heating a heat-transporting medium, and a transport arrangement for the transport of the medium through the heating area, wherein, in the heating area, an opening is provided for the radiation of the sun and an absorber is provided in the path of the incidental radiation of the sun, thereby absorbing this, and wherein a gas absorbing within frequency bands belonging to the infrared range is provided as a heat-transporting medium and the operating parameters of the receiver are set in such a way and the gas is selected in such a way that its temperature during transport through the heating area (to the absorber) increases due to absorption of radiation in such a way that the ratio x of the temperature increase $(T_3-T_2)$ due to the absorption of radiation to the entire temperature increase $(T_4-T_2)$ due to the absorption and convection at the absorber is ≥0.3.

In an embodiment, the ratio x≥0.3 is referred to the absorption of only the absorber radiation so that the temperature during transport through the heating area by means of absorption of the radiation of the absorber increases in such a way that the ratio x of the temperature increase $(T_3-T_2)$ due to the absorption of radiation of the absorber to the entire temperature increase $(T_4-T_2)$ due to the absorption of the radiation of the absorber and convection at the absorber is ≥0.3.

The person skilled in the art can refer the ratio x≥0.3 to the absorption of only the absorber radiation 32, 55 or to the absorption of the absorber radiation including the absorption of the infrared proportion of the solar radiation 4 running through the absorption area 28, 57 (FIGS. 2 and 4).

Preferably, a heteropolar gas is selected as an absorbing gas, furthermore preferred $CO_2$, water vapor, $CH_4$ or a mixture of these gases.

The person skilled in the art can then modify the method according to the invention so that the ratio x is the same or larger than 0.4, or 0.5 or preferably is the same or larger than 0.7, particularly preferred, being the same or larger than 0.8.

In an embodiment, the method according to the invention can be designed in such a way that the gas is led through the absorber. As an alternative, it can be provided that the gas is led past the absorber.

FIG. 9 shows the steps of the manufacturing method according to the invention for a receiver, for example, according to FIGS. 2 to 4, wherein, at step 70, the absorber is designed as a blackbody radiation arrangement with a reduced convection and accordingly, an absorber area interacting with the absorber is provided in order to be able to transfer the heat to the heat-transporting gas. Afterwards, at step 71, a gas absorbing within the frequency bands belonging to the infrared range is provided as a heat-transporting gas together with the dimensions of the absorber area in such a way that a predetermined operational state of the receiver can be defined, in which the temperature increase of the heat-transporting gas due to absorption of (the blackbody (infrared) radiation of the absorber and the infrared proportions of the sun to the temperature increase due to absorption and convection at the absorber is at a ratio of x≥0.3.

A manufacturing method results for a receiver with a heating area for heating a heat-transporting medium and a transport arrangement for the transport of the medium through the heating area, wherein, within the heating area, and optical opening for sunlight is provided and an absorber absorbing the sunlight arranged within the path of the incidental sunlight is provided, characterized in that the absorber is designed as a blackbody radiation arrangement with reduced convection and an absorber area interacting with the absorber is provided, a gas absorbing within frequency bands belonging to the infrared range is provided as a heat-transporting medium in such a way and the absorber area is dimensioned in such a way that, during a predetermined operational state of the receiver, the temperature of the heat-transporting medium flowing operatively through the absorption area increases due to the absorption of the infrared radiation of the absorber (and the infrared proportion of the solar radiation) in such a way that the ratio x of the temperature increase ($T_3$-$T_2$) due to absorption in the absorber area to the overall temperature increase ($T_4$-$T_2$) due to the absorption and convection at the absorber is ≥0.3.

Preferably, a heteropolar gas is selected as a gas, furthermore preferred $CO_2$, water vapor, $CH_4$, $NH_3$, CO, $SO_2$, SO3, HCl, NO, and $NO_2$ or a mixture of these gases.

Thereby, furthermore, in an embodiment of the invention, the ratio x is set to be the same or greater than 0.4, preferably is 0.5, particularly preferred is 0.6, quite preferred is 0.7 and the most preferred is 0.8.

Ultimately, in another embodiment, a secondary absorber can be provided in the absorber area designed as a blackbody radiation arrangement with reduced convection and further preferred, the receiver can be designed as a spatial receiver.

The invention claimed is:

1. A method to operate a receiver with a heating area for heating a heat-transporting medium, and a transport arrangement for the transport of the medium through the heating area, the method comprising:
   providing in the heating area, an opening for the radiation of the sun and an absorber is provided in the path of the incidental radiation of the sun, thereby absorbing the incidental radiation;
   providing a gas absorbing within frequency bands belonging to the infrared range as a heat-transporting medium and operating parameters, a geometry of the heating area and a mass flow of the gas through the heating area of the receiver are set such that the gas is selected and the geometry of the heating area and the mass flow are balanced such that a temperature of the gas during transport through the heating area increases due to absorption of radiation such that a ratio of a temperature increase due to the absorption of radiation to an entire temperature increase due to the absorption and convection at the absorber is ≥0.5, wherein the gas is a heteropolar gas.

2. The method according to claim 1, wherein the temperature increases during the transport through the heating area due to absorption of the radiation of the absorber in such a way that the ratio of the temperature increase due to absorption of the radiation of the absorber to the entire temperature increase due to the absorption of the radiation of the absorber and convection at the absorber is ≥0.5.

3. The method according to claim 1, wherein the heating area has one absorber area provided between the opening and the absorber arranged in the path of the incidental radiation of the sun and wherein the ratio is the ratio of the temperature increase due to absorption of the radiation of the absorber in this absorber area to the entire temperature increase due to absorption and convection at the absorber after the gas has passed this.

4. The method according to claim 1, wherein the heating area has two absorber areas with a shared absorber, and wherein the ratio is provided for one or for both absorber areas.

5. The method according to claim 1, wherein the ratio is the same or greater than 0.8.

6. The method according to claim 1, wherein the gas is led through the absorber.

7. The method according to claim 1, wherein the gas is led past the absorber.

8. The method according to claim 1, wherein the gas is subjected to overpressure within the heating area in a range between 2 and 20 bar.

9. The method according to claim 1, wherein gas is led around the absorber to a back side of the absorber then led away from this.

10. The method according to claim 1, wherein gas heating due to absorption of the radiation of the absorber is removed from the absorber area as soon as it is partially heated and/or a partially heated gas is supplied to the absorber and wherein the supply takes place within the absorber area at the respective location where the temperature in the absorber area corresponds to the temperature of the partially heated gas.

11. The receiver according to claim 10, wherein the ratio is the same or greater than 0.7, or preferably the same or greater than 0.8.

12. The method according to claim 1, wherein the gas is subjected to overpressure between 5 bar and 15 bar.

13. The method according to claim 1, wherein the gas is subjected to overpressure of 10 bar.

14. The method according to claim 1, wherein the gas is a mixture of water vapor and $CO_2$.

15. The method according to claim 1, wherein the gas comprises at least one of $CO_2$, water vapor, $CH_4$, $NH_3$, $SO_2$, $SO_3$, HCl, NO, and $NO_2$.

16. A receiver for carrying out the method according to claim 1, the receiver comprising:
    a heating arrangement for heating a heat-transporting-medium, the heating arrangement comprising a generally cylindrical housing having an opening at a first end for the radiation of the sun, and an absorber at a second end of the generally cylindrical housing arranged in the path of the incidental radiation of the sun, thereby absorbing this solar radiation;
    the heating arrangement defining an absorption area bounded by the opening, the absorber, and a sidewall of the generally cylindrical housing for heating the heat-transporting medium is provided and the absorber is designed as a radiation arrangement acting into the absorption area;
    a transport arrangement for transporting the medium through the heating arrangement, the transport arrangement comprising at least one inlet opening at the first end of the generally cylindrical housing, and at least one outlet opening adjacent to the absorber;
    wherein the heat-transporting medium is primarily a gas absorbing in frequency bands belonging to the infrared range, and wherein, during operation, the absorber and the absorption area interact to produce a ratio of the temperature increase of the gas due to absorption to the temperature increase of the gas due to absorption and convection that is ≥0.5, wherein the heat-transporting gas contains a heteropolar gas.

17. The receiver according to claim 16, wherein the absorber area is dimensioned in such a way that, during operation, the ratio of the temperature increase of the heat-transporting gas absorbing within the frequency bands belonging to the infrared range due to the absorption of the radiation of the absorber within the absorber area to the temperature increase due to absorption of the radiation of the absorber and the convection at the absorber is ≥0.5.

18. The receiver according to claim 16, wherein the absorber area is preferably provided between the opening for the radiation of the sun and the absorber, wherein the ratio is the ratio of the temperature increase due to absorption of the radiation of the absorber in this absorber area to the entire temperature increase due to the absorption and convection at the absorber after the gas has gone through this.

19. The receiver according to claim 16, wherein the heating area has two absorber areas, that jointly share the absorber and wherein the ratio is provided for one or for both absorber areas.

20. The receiver according to claim 19, wherein connection ducts leading around the absorber connect both absorber areas to each other.

21. The receiver according to claim 16, wherein the absorber has a surface, that is at least one partially gas-tight.

22. The receiver according to claim 21, wherein the surface is plate-shaped.

23. The receiver according to claim 16, wherein the walls of the absorption area and/or the absorber are free of coolants.

24. The receiver according to claim 23, wherein the walls of the absorption area and/or the absorber are free of cooling ducts.

25. The receiver according to claim 16, wherein a secondary absorber is provided within the absorption area and is designed and arranged in such a way that it can be heated by the infrared radiation of the absorber and, during operation, has an impact within the absorber area in itself via its radiation.

26. The receiver according to claim 25, wherein the secondary absorber is plate-shaped and does not shadow the absorber.

27. The receiver according to claim 16, wherein the transport arrangement has one or a plurality of lines connected to an absorber area for heat-transporting gas, which are arranged in such a way that partially heated gas is removed from the absorber area and/or partially heated gas can be supplied to a location, at which the temperature of the gas in the absorber area primarily corresponds to the temperature of the partially heated gas supply.

28. The receiver according to claim 16, wherein an absorber area is designed for a pressure of the gas within a range between 2 and 20 bar.

29. The receiver of claim 16, wherein the absorber is a perforated plate.

30. The receiver of claim 29, wherein at least one outlet opening is a single outlet opening positioned generally coaxially with a longitudinal axis of the generally cylindrical housing and located downstream of the absorber.

31. The receiver of claim 16, wherein the absorber is a mesh screen.

32. The receiver of claim 31, wherein at least one outlet opening is a single outlet opening positioned generally coaxially with a longitudinal axis of the generally cylindrical housing and located downstream of the absorber.

33. The receiver of claim 16, wherein the absorber is impermeable to the medium.

34. The receiver of claim 33, wherein the at least one outlet opening is a plurality of outlet openings positioned generally transverse to a longitudinal axis of the generally cylindrical housing, spaced along the longitudinal axis, and located upstream of the absorber.

35. The receiver of claim 16 wherein the heating arrangement further comprises a frustoconical housing having a first end connected to the second end of the generally cylindrical housing and a second end downstream of the first end, the second end having a diameter smaller than the first end, the at least one outlet opening is a single outlet opening located at the second end, and wherein the heating arrangement defines a second absorption area bounded by the absorber, a sidewall of the generally frustoconical housing, and the outlet opening.

36. The receiver of claim 16 wherein the generally planar absorber is a first absorber, and wherein the heating arrangement further comprises a second generally planar absorber extending generally perpendicularly from the first absorber toward the opening, the second absorber aligned parallel to a flow direction of the medium.

37. The receiver of claim 16 wherein the at least one inlet opening comprises a plurality of inlet openings spaced circumferentially around the first end of the generally cylindrical housing.

38. The receiver of claim 37 wherein the inlet openings are positioned between respective circumferential perimeters of the opening and the generally cylindrical housing.

39. The receiver of claim 16 wherein the absorber and the absorption area are dimensioned such that the absorption area has a diameter and a height that are about equal, and a surface area of the absorber is about twice a surface area of the opening.

40. The receiver of claim 16 wherein the absorber and the absorption area are dimensioned such that the absorption area has a diameter of about 15.96 meters and a height of about 15.96 meters, and the opening has a diameter of about 11.28 meters.

41. The method according to claim 16, wherein the gas comprises at least one of $CO_2$, water vapor, $CH_4$, $NH_3$, $SO_2$, $SO_3$, HCl, NO, and $NO_2$.

42. A manufacturing method for a receiver with a heating area for heating a heat-transporting medium and a transport arrangement for the transport of the medium through the heating area, wherein, within the heating area, an optical opening for sunlight is provided and an absorber absorbing the sunlight arranged within the path of the incidental sunlight is provided, wherein the absorber is designed as a radiation arrangement and an absorber area interacting with the absorber is provided, a gas absorbing within frequency bands belonging to the infrared range is provided as a heat-transporting medium in such a way and the absorber area is dimensioned in such a way that, during a predetermined operational state of the receiver, a temperature of the heat-transporting medium flowing operatively through the absorption area increases due to the absorption of the infrared radiation of the absorber in such a way that a ratio of a temperature increase due to absorption in the absorber area to an overall temperature increase due to the absorption and convection at the absorber is ≥0.5, wherein the gas has a heteropolar gas.

43. The method according to claim 42, wherein an absorber area is arranged within the path of the incidental radiation of the sun between the opening and the absorber, and the ratio is provided as a ratio of the temperature increase due to the absorption of the radiation of the absorber within this absorber area to the entire temperature increase due to the absorption and convection at this absorber after the gas has passed this.

44. The receiver according to claim 42, wherein the ratio is the same or larger than 0.8.

45. The receiver according to claim 42, wherein a secondary absorber designed as a radiation arrangement is provided within the absorber area.

46. The method according to claim 42, wherein the gas comprises at least one of $CO_2$, water vapor, $CH_4$, $NH_3$, $SO_2$, $SO_3$, HCl, NO, and $NO_2$.

* * * * *